United States Patent
LeFranc et al.

(10) Patent No.: US 11,900,658 B2
(45) Date of Patent: Feb. 13, 2024

(54) METHOD FOR AUTOMATED STRATIGRAPHY INTERPRETATION FROM BOREHOLE IMAGES

(71) Applicant: Schlumberger Technology Corporation, Sugar Land, TX (US)

(72) Inventors: Marie LeFranc, Cambridge, MA (US); Zikri Bayraktar, Wilmington, MA (US); Morten Kristensen, Cambridge, MA (US); Philippe Marza, Montpellier (FR); Isabelle Le Nir, Clamart (FR); Michael Prange, Somerville, MA (US); Josselin Kherroubi, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 37 days.

(21) Appl. No.: 17/593,011

(22) PCT Filed: Mar. 11, 2020

(86) PCT No.: PCT/US2020/022131
§ 371 (c)(1),
(2) Date: Sep. 3, 2021

(87) PCT Pub. No.: WO2020/185918
PCT Pub. Date: Sep. 17, 2020

(65) Prior Publication Data
US 2022/0164594 A1  May 26, 2022

Related U.S. Application Data

(60) Provisional application No. 62/816,466, filed on Mar. 11, 2019.

(51) Int. Cl.
*G06V 10/772* (2022.01)
*G06F 18/2431* (2023.01)
(Continued)

(52) U.S. Cl.
CPC ........ *G06V 10/772* (2022.01); *G06F 18/2148* (2023.01); *G06F 18/2415* (2023.01);
(Continued)

(58) Field of Classification Search
CPC .... G06V 10/772; G06V 10/774; G06V 10/82; G06V 10/454; G06V 10/77;
(Continued)

(56) References Cited

U.S. PATENT DOCUMENTS 10,121,261 B2  11/2018  Kherroubi et al.
2006/0161406 A1  7/2006  Kelfoun
(Continued)

OTHER PUBLICATIONS

Office Action issued in Norwegian Patent Application No. 20211154 dated Aug. 22, 2022, 6 pages.
(Continued)

*Primary Examiner* — Qun Shen
(74) *Attorney, Agent, or Firm* — Jeffrey D. Frantz

(57) ABSTRACT

Embodiments of the present disclosure are directed towards systems and methods for automated stratigraphy interpretation from borehole images. Embodiments may include constructing, using at least one processor, a training set of synthetic images corresponding to a borehole, wherein the training set includes one or more of synthetic images, real images, and modified images. Embodiments may further include automatically classifying, using the at least one processor, the training set into one or more individual sedimentary geometries using one or machine learning techniques. Embodiments may also include automatically classifying, using the at least one processor, the training set into one or more priors for depositional environments.

14 Claims, 17 Drawing Sheets

(51) Int. Cl.
  *G06F 18/214* (2023.01)
  *G06F 18/2415* (2023.01)
  *G06V 10/774* (2022.01)
  *G06V 10/82* (2022.01)
  *G06V 10/44* (2022.01)

(52) U.S. Cl.
  CPC ........ *G06F 18/2431* (2023.01); *G06V 10/774* (2022.01); *G06V 10/82* (2022.01); *G06V 10/454* (2022.01)

(58) Field of Classification Search
  CPC ............. G06F 18/2148; G06F 18/2415; G06F 18/2431; G06F 18/24323; G06F 18/28; G06F 18/214; G06F 18/00; E21B 47/022
  See application file for complete search history.

(56) References Cited

U.S. PATENT DOCUMENTS

| | | | |
|---|---|---|---|
| 2009/0103677 | A1 | 4/2009 | Wood |
| 2009/0259446 | A1* | 10/2009 | Zhang ................. G06F 30/20 703/2 |
| 2014/0177947 | A1 | 6/2014 | Krizhevsky |
| 2015/0241591 | A1 | 8/2015 | Burmester et al. |
| 2016/0019459 | A1 | 1/2016 | Audhkhasi et al. |
| 2017/0177997 | A1* | 6/2017 | Karlinsky ............ G06V 10/993 |
| 2017/0372490 | A1* | 12/2017 | Kherroubi ................. G01V 1/50 |
| 2018/0315182 | A1* | 11/2018 | Rapaka ................. G06T 7/0012 |
| 2019/0034812 | A1* | 1/2019 | Borrel ................. G01V 99/005 |
| 2020/0183047 | A1* | 6/2020 | Denli ....................... G01V 1/50 |
| 2020/0226420 | A1* | 7/2020 | Shaubi .................... G06T 7/001 |

OTHER PUBLICATIONS

Abbreviated Exam Report Under Section 18(3) dated Aug. 31, 2022, 4 pages.
Alqahtani, N. et al., "Deep Learning Convolutional Neural Networks to Predict Porous Media Properties", SPE-191906, Presented at the SPE Asia Pacific Oil and Gas Conference and Exhibition held in Brisbane, Australia, 2018, 10 pages.
Anxionnaz, H. et al., "Near-Wellbore 3D Reconstruction of Sedimentary Bodies from Borehole Electrical Images", SPWLA 39th Annual Logging Symposium, Keystone, Colorado, USA, 1998, 14 pages.
Bahadidah, T. A. et al., "Integrating High-Resolution Multiwell Image Logs to Improve Geological Reservoir Characterization and Sequence Stratigraphy", IPTC-18209-MS, International Petroleum Technology Conference, Kuala Lumpur, Malaysia, 2014.
Curray, J. R., "The Analysis of Two-Dimensional Orientation Data", Journal of Geology, 1955, 64, pp. 117-131.
Fukushima, K., "Neocognitrol: A self-organizing Neural Network Model for a Mechanism of Pattern Recognition Unaffected by Shift in Position", Biological Cybernetics, 1980, 36(4), pp. 193-202.
Girshick, R. B et al., "Rich feature hierarchies for accurate object detection and semantic segmentation" 2014 IEEE Conference on Computer Vision and Pattern Recognition, pp. 580-587.
Girshick, R. Fast R-CNN, 2015 IEEE International Conference on Computer Vision (ICCV), pp. 1440-1448.
Glover, P. W.J. et al., "The characterization of trough and planar cross-bedding from borehole image logs", Journal of Applied Geophysics, 2007, 62, pp. 178-191.
He, K. et al., "Deep Residual Learning for Image Recognition", http://arxiv.org/abs/1512.03385, 12 pages.

Krizhevsky, A. et al., "ImageNet Classification with Deep Convolutional Neural Networks", Proceedings of the 25th International Conference on Neural Information Processing Systems, Lake Tahoe, Nevada, USA., 2012, pp. 1-9.
Luthi, S. M. et al., "Models to Interpret Bedform Geometries from Cross-Bed Data", The Journal of Geology, 1990, 98(2), pp. 171-187.
Luthi, S. M., "Sedimentary structures of clastic rocks identified from electrical borehole images", in Geological Applications of Wireline Logs Geological Society Special Publication, 1990, 48, pp. 3-10.
Redmon, J. et al., "You Only Look Once: Unified, Real-Time Object Detection", 2016 IEEE Conference on Computer Vision and Pattern Recognition (CVPR), pp. 779-788.
Ren, S. et al., "Faster R-CNN: Towards Real-Time Object Detection with Region Proposal Networks", Proceedings of the 28th International Conference on Neural Information Processing Systems—vol. 1, Montreal, Canada, 2015, 9 pages.
Scheidegger, A.E., "On the Statistics of the Orientation of Bedding Planes, Grain Axes, and Similar Sedimentological Data", U.S. Geological Survey Professional. Paper 525-C, 1965, pp. C164-167.
Schmidhuber, J., "Deep Learning in Neural Networks: An Overview" Neural Networks, 2015, 61, pp. 85-117.
Shrivastva, C. et al., "Reconstructing Sedimentary Depositional Environment with Borehole Imaging and Core: A Case Study from Eastern Offshore India", IPTC12253, presented at the International Petroleum Technology Conference, Kuala Lumpur, Malaysia, 2008, 12 pages.
Simonyan, K. et al., "Very Deep Convolutional Networks for Large-Scale Image Recognition", ICLR 2015, 14 pages.
Szegedy, C. et. al., "Going deeper with convolutions", Proceedings of the IEEE Conference on Computer vision and Pattern Recognition 2015, 12 pages.
Wilson, S. R. , "Controls on Sediment Distribution in the Late Permian Rangal Coal Measures of the Nebo Synclinorium", Thesis submitted for the degree of Master of Philosophy at the University of Queensland, Australia, 2017, 201 pages.
Zhang, P. Y. et al., "Deep Learning Method for Lithology Identification from Borehole Images", 79th EAGE Conference and Exhibition, Paris, France, 2017, 5 pages.
International Search Report and Written Opinion of PCT Application No. PCT/US2020/022131 dated Jun. 15, 2020, 8 pages.
International Preliminary Report on Patentability of PCT Application No. PCT/US2020/022131 dated Sep. 23, 2021, 8 pages.
Potter, P. E. et al., "Paleocurrents and Basin Analysis", 2nd Edition, Springer-Verlag, New York, 1977, p. 256-257.
LeCun Y., Haffner P., Bottou L. and Bengio Y. 1999. Object Recognition with Gradient-based Learning, Shape, Contour and Grouping in Computer Vision, Springer-Verlag, p. 321-323.
Miall, A.D., "Principles of Sedimentary Basin Analysis", Springer Verlag, New York, 1984, 490p, (pp. 29-34, 151-190, 209-247).
Rubin D.M. and Carter C.L. 2005. Appendix 2. Special features, Part A. Documentation of MATLAB code, Rubin D.M. and Carter C.L. Bedforms 4.0: Matlab code for simulating bedforms and cross-beddings. USGS open-file report 2005-1272. (13 pages).
Reineck, H.-E. et al., "Depositional Sedimentary Environments, With Reference to Terrigenous Clastics", 1980, Second, revised and updated version. Springer-Verlag Berlin, Heidelberg, New York. 549p. (pp. 95-129, 229, 274, 277, 283, 285, 291, 297, 299, 318, 368, 394).
Taylor, T. D., 1986, Interpretation of large-scale cross-strata in a borehole-a computer simulation model: Unpub. M. Sc. Thesis, Pennsylvania State University, University Park, 171 pages.
David M. Rubin and Carissa L. Carter, 2006, Bedform Sedimentology Site: Bedforms and Cross-Bedding in Animation, link is https://cmgds.marine.usgs.gov/data/seds/bedforms/credits_long.html, downloaded on Mar. 17, 2022 (3 pages).

\* cited by examiner

| | VARIABILITY | ORIENTATION RELATIVE TO TRANSPORT | BEDFORMS MORPHO. & VERTICAL SECTIONS | HORIZONTAL & VERTICAL SECTIONS | POLAR PLOTS X-BEDS & BOUNDING SURFACES DIP DIR |
|---|---|---|---|---|---|
| 2D | INVARIABLE | TRANSVERSE, OBLIQUE AND LONGITUDINAL | | | |
| 2D | VARIABLE | TRANSVERSE, OBLIQUE AND LONGITUDINAL | | | |
| | INVARIABLE | PERFECTLY TRANSVERSE | | | |
| | INVARIABLE | OBLIQUE, IMPERFECTLY TRANSVERSE, OR IMPERFECTLY LONGITUDINAL | | | |
| | INVARIABLE | PERFECTLY LONGITUDINAL | | | |
| 3D | VARIABLE | PERFECTLY TRANSVERSE | | | |
| 3D | VARIABLE | OBLIQUE, IMPERFECTLY TRANSVERSE, OR IMPERFECTLY LONGITUDINAL | | | |
| 3D | VARIABLE | PERFECTLY LONGITUDINAL | | | |

FIG. 4

METHOD FOR AUTOMATED STRATIGRAPHY INTERPRETATION FROM BOREHOLE IMAGES

RELATED APPLICATIONS

This application claims the benefit of U.S. Provisional Application No. 62/816,466, filed on Mar. 11, 2019; the contents of which is incorporated herein by reference.

FILED OF THE INVENTION

The present disclosure relates to automatic stratigraphy interpretation from borehole images, more specifically, to a system and method for automatic stratigraphy interpretation from borehole images.

BACKGROUND

When studying geological structures of sedimentary origin, outcrop exposures may be used to study and classify the geological structures. The geological structures of sedimentary origin may include a sedimentary facies having a specific depositional environment, also referred to as a depositional facies. The depositional facies may be interpreted qualitatively based on log shape. However, this approach is often non-unique and requires supporting information from core description, regional geology, seismic attributes, and/or borehole images. As a different approach, borehole images can provide additional information to better characterize depositional environments, such as the geometry of sedimentary bodies, grain size variation, and paleo-current direction.

While image description approaches and manual approaches to studying the depositional facies exist, image description approaches appear to be more and more automated (i.e., dip picking, structural zonation, and structural dip removal), whereas manual approaches include sedimentological environment interpretation and sequence stratigraphy. However, manual interpretation may be user biased, time consuming, and can become very challenging when dealing with highly deviated wells. For example, the same sedimentary geometry observed on borehole images from wells with different well deviations and orientations can have a completely different signatures, from a regular, symmetrical sinusoid on vertical wells to very elongated patterns on horizontal wells.

SUMMARY

This summary is provided to introduce a selection of concepts that are further described below in the detailed description. This summary is not intended to identify essential features of the claimed subject matter, nor is it intended to be used as an aid in limiting the scope of the claimed subject matter.

Embodiments of the present disclosure are directed towards a method for automated stratigraphy interpretation from borehole images. The method may include constructing, using at least one processor, a training set of synthetic images corresponding to a borehole, wherein the training set includes one or more of synthetic images, real images, and modified images. The method may further include automatically classifying, using the at least one processor, the training set into one or more individual sedimentary geometries using one or more machine learning techniques. The method may also include automatically classifying, using the at least one processor, the training set into one or more priors for depositional environments.

One or more of the following features may be included. In some embodiments, constructing a training set may include a forward model to generate the synthetic images and/or an addition of noise to the synthetic images. Automatically classifying one or more individual sedimentary geometries may include applying one or more machine learning techniques. Automatically classifying into priors for depositional environments may include applying one or more machine learning techniques. Automatically classifying into priors may include building one or more tables of sedimentary geometry successions that represent one or more depositional environments. An addition of noise may include at least one of adding one or more masking stripes on the one or more synthetic images, adding one stripe on the one or more synthetic images, adding a one-pixel stripe to the one or more synthetic images, adding white noise to the one or more synthetic images, translating patterns on the one or more synthetic images, truncating the one or more synthetic images, or adding geometric noise. The method may include utilizing one or more automated individual sedimentary geometry predictions to establish a depositional environment predictor. The depositional environment predictor may include a decision tree-based machine-learning, fuzzy-logic based algorithms, or a probabilistic graphical model. The method may include identifying a longer than standard borehole image and applying a sliding window as a spatial sampling technique.

In another embodiment of the present disclosure a system for automated stratigraphy interpretation from borehole images is provided. The system may include a memory configured to store one or more borehole images and at least one processor configured to construct a training set of synthetic images corresponding to a borehole, wherein the training set includes one or more of synthetic images, real images, and modified images. The at least one processor may be further configured to automatically classify the training set into one or more individual sedimentary geometries using one or more machine learning techniques. The at least one processor may be further configured to automatically classify the training set into one or more priors for depositional environments.

One or more of the following features may be included. In some embodiments, constructing a training set may include a forward model to generate the synthetic images and/or an addition of noise to the synthetic images. Automatically classifying one or more individual sedimentary geometries may include applying one or more machine learning techniques. Automatically classifying into priors for depositional environments may include applying one or more machine learning techniques. Automatically classifying into priors may include building one or more tables of sedimentary geometry successions that represent one or more depositional environments. An addition of noise may include at least one of adding one or more masking stripes on the one or more synthetic images, adding one stripe on the one or more synthetic images, adding a one-pixel stripe to the one or more synthetic images, adding white noise to the one or more synthetic images, translating patterns on the one or more synthetic images, truncating the one or more synthetic images, or adding geometric noise. The system may include utilizing one or more automated individual sedimentary geometry predictions to establish a depositional environment predictor. The depositional environment predictor may include a decision tree-based machine-learning, fuzzy-logic based algorithms, or a probabilistic graphical model. The system may include identifying a longer than standard borehole image and applying a sliding window as a spatial sampling technique.

BRIEF DESCRIPTION OF THE DRAWINGS

The present invention is illustrated by way of example, and not limitation, in the figures of the accompanying drawings in which like references indicate similar elements and in which:

FIG. 4 is a diagram illustrating bedform morphology and vertical sections, horizontal and vertical sections, and polar plots of cross beds and bounding-surface dip directions;

DESCRIPTION

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Figure 1:
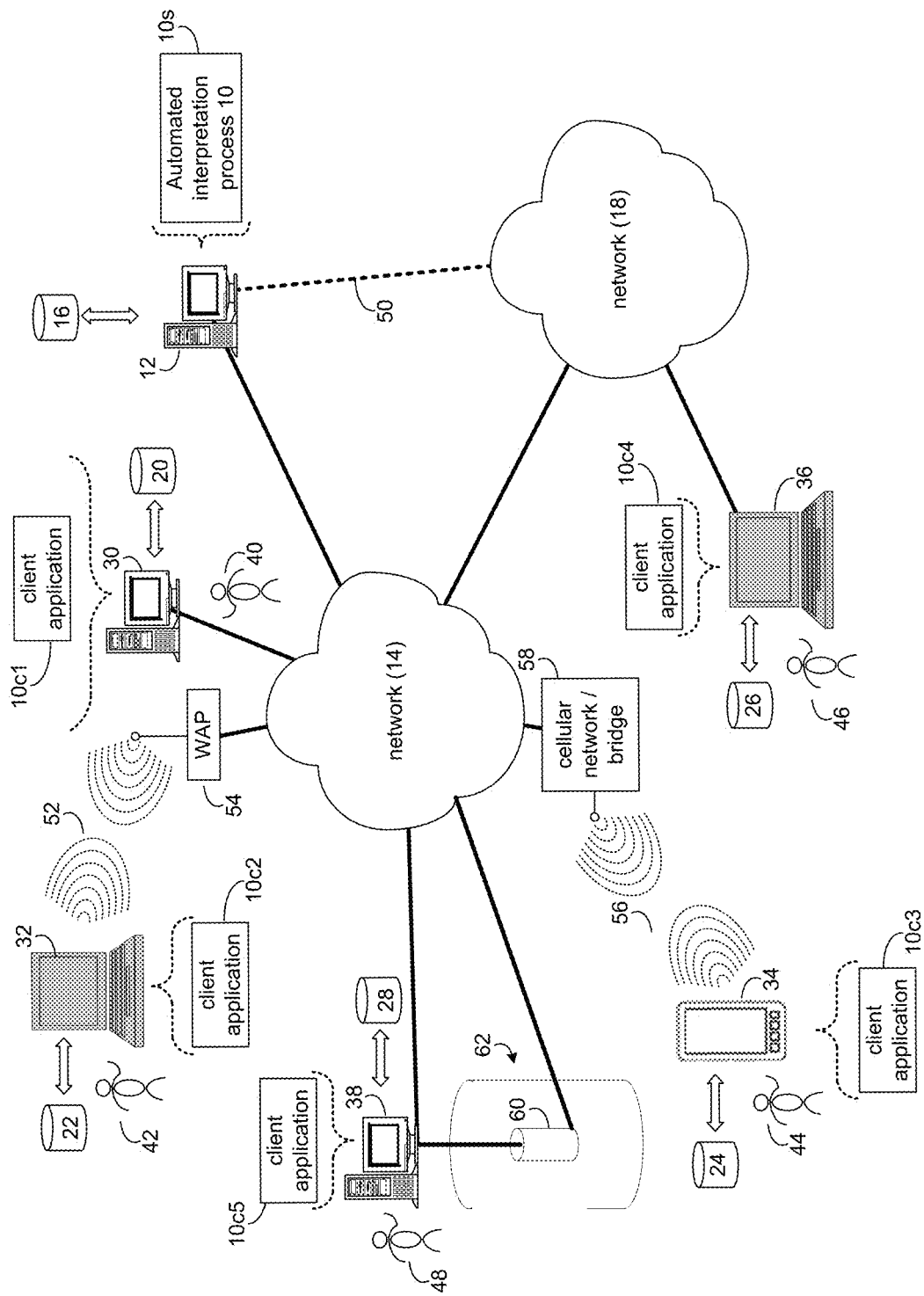
FIG. 1 is a system in accordance with the automated interpretation process of the present disclosure.

Referring to FIG. 1, there is shown a method for automated stratigraphy interpretation from borehole images, referred to hereinafter as "automated interpretation process 10." For the following discussion, it is intended to be understood that automated interpretation process 10 may be implemented in a variety of ways. For example, automated interpretation process 10 may be implemented as a server-side process, a client-side process, or a server-side/client-side process.

For example, automated interpretation process 10 may be implemented as a purely server-side process via automated interpretation process 10s. Alternatively, automated interpretation process 10 may be implemented as a purely client-side process via one or more of client-side application 10c1, client-side application 10c2, client-side application 10c3, and client-side application 10c4. Alternatively still, automated interpretation process 10 may be implemented as a server-side/client-side process via server-side automated interpretation process 10s in combination with one or more of client-side application 10c1, client-side application 10c2, client-side application 10c3, client-side application 10c4, and client-side application 10c5. In such an example, at least a portion of the functionality of automated interpretation process 10 may be performed by automated interpretation process 10s and at least a portion of the functionality of automated interpretation process 10 may be performed by one or more of client-side application 10c1, 10c2, 10c3, 10c4, and 10c5.

Accordingly, automated interpretation process 10 as used in this disclosure may include any combination of automated interpretation process 10s, client-side application 10c1, client-side application 10c2, client-side application 10c3, client-side application 10c4, and client-side application 10c5.

Automated interpretation process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of automated interpretation process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

The instruction sets and subroutines of client-side application 10c1, 10c2, 10c3, 10c4, 10c5 which may be stored on storage devices 20, 22, 24, 26, 28 (respectively) coupled to client electronic devices 30, 32, 34, 36, 38 (respectively), may be executed by one or more processors (not shown) and one or more memory architectures (not shown) incorporated into client electronic devices 30, 32, 34, 36, 38 (respectively). Examples of storage devices 20, 22, 24, 26, 28 may include but are not limited to: hard disk drives; tape drives; optical drives; RAID devices; random access memories (RAM); read-only memories (ROM), and all forms of flash memory storage devices.

Examples of client electronic devices 30, 32, 34, 36, 38 may include, but are not limited to, personal computer 30, 38, laptop computer 32, mobile computing device 34, notebook computer 36, a netbook computer (not shown), a server computer (not shown), an Internet of Things (IoT) device (not shown), a gaming console (not shown), a data-enabled television console (not shown), and a dedicated network device (not shown). Client electronic devices 30, 32, 34, 36, 38 may each execute an operating system.

Users 40, 42, 44, 46, 48 may access automated interpretation process 10 directly through network 14 or through secondary network 18. Further, automated interpretation process 10 may be accessed through secondary network 18 via link line 50.

The various client electronic devices (e.g., client electronic devices 30, 32, 34, 36, 38) may be directly or indirectly coupled to network 14 (or network 18). For example, personal computer 30 is shown directly coupled to network 14. Further, laptop computer 32 is shown wirelessly coupled to network 14 via wireless communication channels 52 established between laptop computer 32 and wireless access point (WAP) 54. Similarly, mobile computing device 34 is shown wirelessly coupled to network 14 via wireless communication channel 56 established between mobile computing device 34 and cellular network/bridge 58, which is shown directly coupled to network 14. WAP 54 may be, for example, an IEEE 802.11a, 802.11b, 802.11g, 802.11n, Wi-Fi, and/or Bluetooth device that is capable of establishing wireless communication channel 52 between laptop computer 32 and WAP 54. Additionally, notebook computer 36 is shown directly coupled to network 18 via a hardwired network connection.

As generally discussed above, a portion and/or all of the functionality of automated interpretation process 10 may be provided by one or more of client side applications 10c1-10c5. For example, in some embodiments automated interpretation process 10 (and/or client-side functionality of automated interpretation process 10) may be included within and/or interactive with client-side applications 10c1-10c5, which may include client side electronic applications, web browsers, or another application. Various additional/alternative configurations may be equally utilized.

Regarding specific terminology used herein, the term "bedform" refers to an overall bed geometry that exists at a given time in response to the flow (i.e., bed configuration) is composed of individual topographic elements (i.e., bed forms). An ensemble of like bed configurations that can be produced by a given mean flow over a given sediment is denoted as a bed state. The term bed phase may further be used to denote different kinds of bed configurations that are produced over a range of flow and sediment conditions and are closely related in geometry and dynamics. The term bedform is indiscriminately used herein to denote all four aspects of the bed geometry. While sedimentologists have given attention to bedforms mostly because of their role in the development of stratification in sedimentary deposits, bedforms are one of the most useful tools available for interpreting ancient sedimentary environments.

Further, the term ripples refers to the stronger the grain transport, the sooner the bed forms appear, and the faster they approach equilibrium. These bedforms, classified as ripples, show generally triangular cross sections. The region around the highest point on the ripple profile is the crest, and the region around the lowest point is the trough. The upstream-facing surface of the ripple is the toss surface, the downstream-facing surface is the lee surface. The average spacing of ripples is of the order of 10-20 cm, and the average height is a few centimeters.

The term dunes refers to where at a flow velocity that's a middling fraction of a meter a second, ripples are replaced by larger bedforms called dunes. Dunes are broadly similar to ripples in geometry and movement, but they are about an order of magnitude larger.

Additionally, cross-stratification is best defined as stratification that is locally inclined at some angle to the overall plane of stratification as a consequence of changes in the geometry of the depositional surface during deposition. The best way to interpret those terms is to assume that cross-stratification is associated with the behavior of individual flow-molded geometrical elements on a transport surface within some broader flow. Cross-stratification is formed by the erosion and deposition associated with a train of bed forms as the average bed elevation increases by net addition of sediment to some area of the bed. They are arranged as sets of conformable laminae, planar or curving, that are separated from adjacent sets by erosional set boundaries or truncation surfaces.

Figure 2:
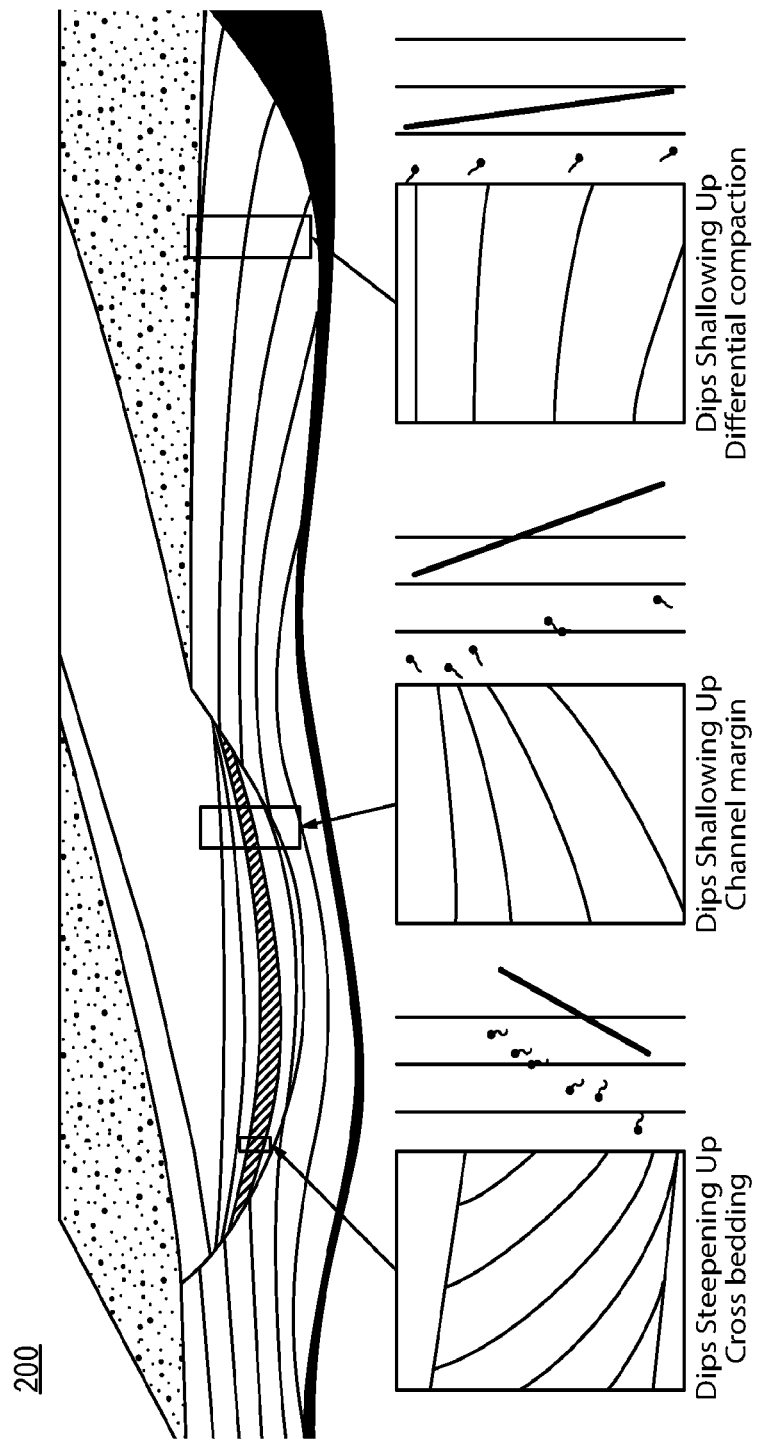
FIG. 2 is a diagram illustrating interpreted causes of steepening-upward and shallowing-upward dip trends in sedimentary strata.
Figure 3:
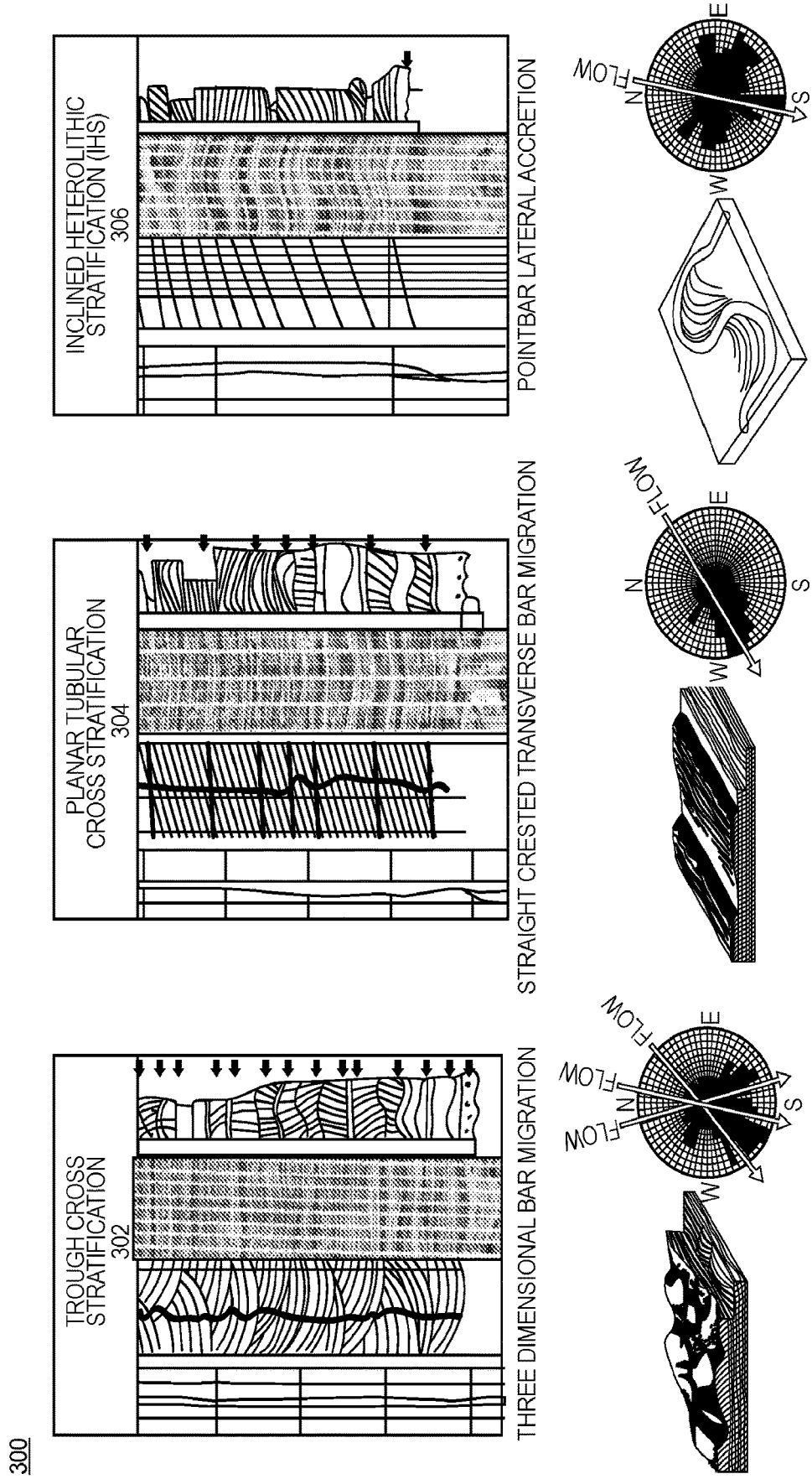
FIG. 3 is a diagram illustrating a determination of one or more paleoflow directions using down-hole scan images.

Turning back to borehole images, sedimentary geometry on borehole images may typically be manually classified. The classifications may include bed boundary, sedimentary dip, erosive surface, cross bedding, and/or deformed bed. In contrast, bedform geometry interpretation from a cross-bed data appears to rarely be performed. For example, when one or more bedform crests migrate in the direction of or obliquely to the sediment transport direction, the resulting sedimentary geometries on borehole images will vary considerably. The geometry resulting from the change in flow direction generating different bedform shapes is also rarely interpreted. Analysis of classified internal bedding dips can provide important information on sediment dispersal directions and sedimentary environments, as illustrated in FIG. 2 and FIG. 3 where FIG. 2 illustrates interpreted cause of steepening-upward and shallowing-upward dip trends in sedimentary strata and FIG. 3 illustrates determination of paleoflow directions using down-hole scan images. Specifically, FIG. 3 illustrates trough cross stratification 302, which includes 3D bar migration and may have low gamma ray response, blocky to fining upwards motif, sigmoidal cross beds, thin (i.e., 0.2-0.8 meter) bed sets with common basal scour, low to moderate angle dips (i.e., 10-15°) and variable dip direction (i.e., SW, S, SE). Planar tabular cross stratification 304 may include straight crested transverse bar migration, which may include low gamma ray response, blocky to fining upwards motif, planner cross beds, high to moderate angle dip (i.e., 10-30°), 1-3 meter thick bed sets with common basal scour, and dip direction (i.e., SW). Inclined heterolithic stratification (HS) 306 may include pointbar lateral accretion, which may include moderate gamma ray response, heterolithic and fining upwards motif, dip direction rotates counter clockwise upwards as point bar apex migrates downstream, bimodal dip (i.e., west for left bank, east for right bank) and 2-3 meter thick bed sets.

In some embodiments in accordance with the present disclosure, a borehole image on which one or more dips of sedimentary features (i.e., sinusoids or segments) may be required as a main input of data. Further, an approach to automated dip picking on borehole images is known and is used on processed borehole images to provide necessary images to run the new automated classification.

A goal of the present disclosure is to include a catalog of 3D bedform geometries and to create, from the 3D models, one or more synthetic borehole images for wells with various diameters, orientations, and inclinations. Regarding known methods, using cross-bed measurements to determine paleocurrent directions and depositional environments is known in the field as well as a relationship showing that cross-bedding and current ripples indicate a paleoslope. These structures provide an unmistakable answer in alluvial-deltaic sandstones, as do oscillation and wave-formed ripples, which commonly strike parallel to shorelines of lakes, seas, and oceans. In turbidites, ripple marks may indicate paleoslope. Further, most studies of ancient marine shelf sandstones, both terrigenous and carbonate, often suggest an overall net transport down paleoslope.

In regards to construction of models used to interpret bedform geometries from cross-bed data, two computational approaches are known: a statistical random sampling technique over the area of the deposit and an analytical method based on topology and differential geometry. For example, a computer model called RIPSYM exists that simulates the formation of cross-strata sets produced by the migration of three-dimensional large-scale ripple trains. The model assumes uniform and steady sediment transport rates and the following independent variables: phase angle, crestline sinuosity, location and radius of the borehole, bedform migration velocity, length of time step, number of time steps, and number of ripple crests. Further, an approach considering reconstruction of bedform geometry away from the wellbore is known, where the approach is constrained by the information available on the cylindrical borehole wall, and achieved by numerically solving an inverse problem.

In some embodiments according to the present disclosure, computer images may be used to build a forward model. Table 1 below illustrates parameters specified for each experiment including the spacing, steepness, asymmetry, migration direction, migration speed, planform shape, and along-crest migration speed of planform sinuosities of each set of bedforms. Further, table illustrates 2D and 3D dimensionality, variability, and orientation relative to transport parameters used in classifying bedforms.

TABLE 1

| | | |
|---|---|---|
| Two-dimensional 2D bedforms are straight and parallel in plan form; the flanks of the bedforms have the same strike at all locations. 2D bedforms produce 2D cross-bedding: cross-bedding in which all forests and bounding surfaces have the same strike. In plots showing the direction and inclination of dips of cross-beds and bounding surfaces, dips of all planes, plot along a single straight line through the center of the plot. | Invariable Invariable bedforms are those that do not change in morphology or path of climb. Cross-bedding deposited by invariable 2D bedforms has bounding surfaces that are parallel planes; their poles plot as single point. | Transverse, oblique, and longitudinal Tranvserse, oblique, and longitudinal cross beddding are not distinguishable unless bedforms are at least slightly 3D. |
| | Variable Variable bedforms are those that change in morphology or path of climb. Variability causes dispersion in the inclination of bounding surfaces. Cross-bedding deposited by variable 2D bedforms are bounding surfaces with a constant strike but with varying inclination; their poles plot as a straight line that parallels the line of cross-bed dips. | Transverse, oblique, and longitudinal Transverse, oblique, and longitudinal cross-bedding are not distinguishable unless bedforms are at least slightly 3D. |
| Three-dimensional 3D bedforms are curved in plan flor or have plan-form complexities such as scour pits or superimposed bedforms with a different trend from the main bedform: the strike of the flanks varies with location. 3D bedforms produce | Invariable Cross-bedding deposited by invariable 3D bedforms has bounding surfaces that are trough-shaped; bounding surface dips in a single trough (or in identical troughs) plot as a nearly straight line. | Perfectly transverse Plots of cross-bed and bounding-surface dips have bilateral symmetry; the axis of symmetry is the same for both plots; dips directions are distributed unimodally. Obilique, imperfectly transverse, or imperfectly longitudinal Plots of cross-bed and bounding-surface dips have bilateral symmetry; the axis of symmetry is the same for |

TABLE 1-continued

| | | |
|---|---|---|
| 3D cross-bedding in which foreset and bounding surface strikes vary with location; dips of foresets do not plot along a single straight line through the center of polar plots. | | both plots; dip directions are distributed unimodally. Perfectly longitudinal Plots of cross-bed and bounding-surface dips have bilateral symmetry; dip directions may be distributed bimodally or be unimodal as a result of migration of the nose of the main bedform. Perfect longitudinallity is evidenced by vertical accretion of bedforms; cross-beds dip in opposing directions on opposite flanks. |
| | Variable Bounding surfaces have complex shapes produced by such processes as zig-zagging of scour pits; dips of bounding surfaces plot as scatter diagrams. | Perfectly transverse Same as perfectly transverse, invariable, 3D cross-bedding Oblique, imperfectly transverse, or imperfectly longitudinal Same as oblique or imperfectly aligned, invariable, 3D cross-bedding Perfectly longitudinal Same as perfectly longitudinal, invariable, 3D cross-bedding. |

A computer model may account for variation of bedform morphology and behavior through time. A total of 75 geometric parameters may control different geometries of the bedforms. Three separate computer programs were used to produce the images shown in FIG. 4. FIG. 4 further illustrates bedform morphology and vertical sections, horizontal and vertical sections and polar plots of cross beds and bounding-surface dip directions. By varying one or more input parameters, each computer program model may model different depositional situations, as illustrated in FIG. 5.

Figure 5:
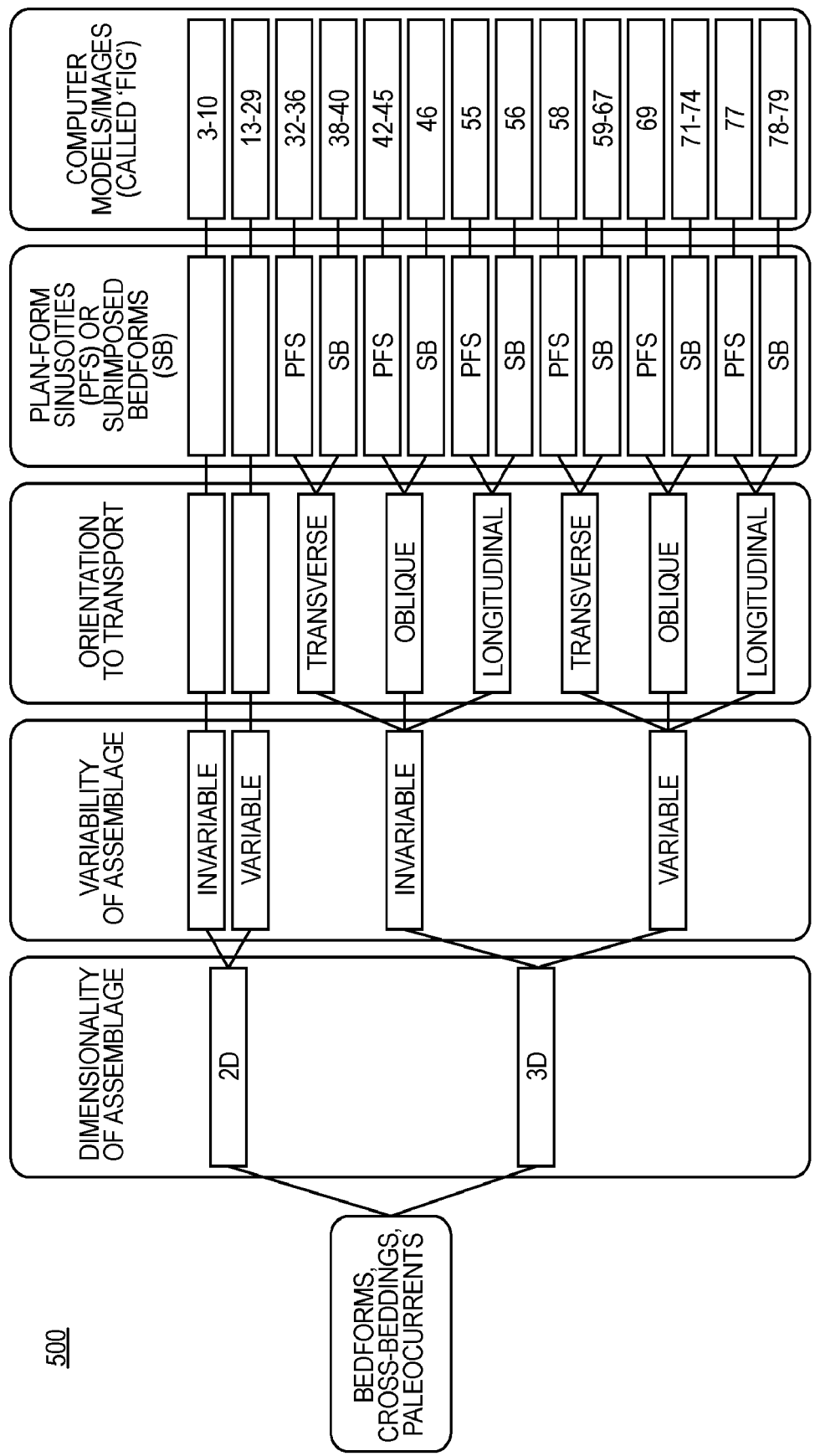
FIG. 5 is a block diagram illustrating how different computer images are arranged according to classification parameters.

FIG. 5 further illustrates how the above mentioned computer program models are arranged according to classification parameters. For example, a first computer program may calculate a topography of a bed surfaces and display the surface in a 3D perspective. The resulting image may include both bed morphology and internal structures. A second computer program may produce perspective block diagrams with horizontal sections instead of bed morphology at the top of the block. Further, a third computer program may plot vectors that represent a migration of bedforms and scour pits. Specifically, the third computer program may plot a direction of sediment transport represented by bedform migration azimuth. It may also plot inclination of cross-bed and bounding-surface planes.

Figure 6:
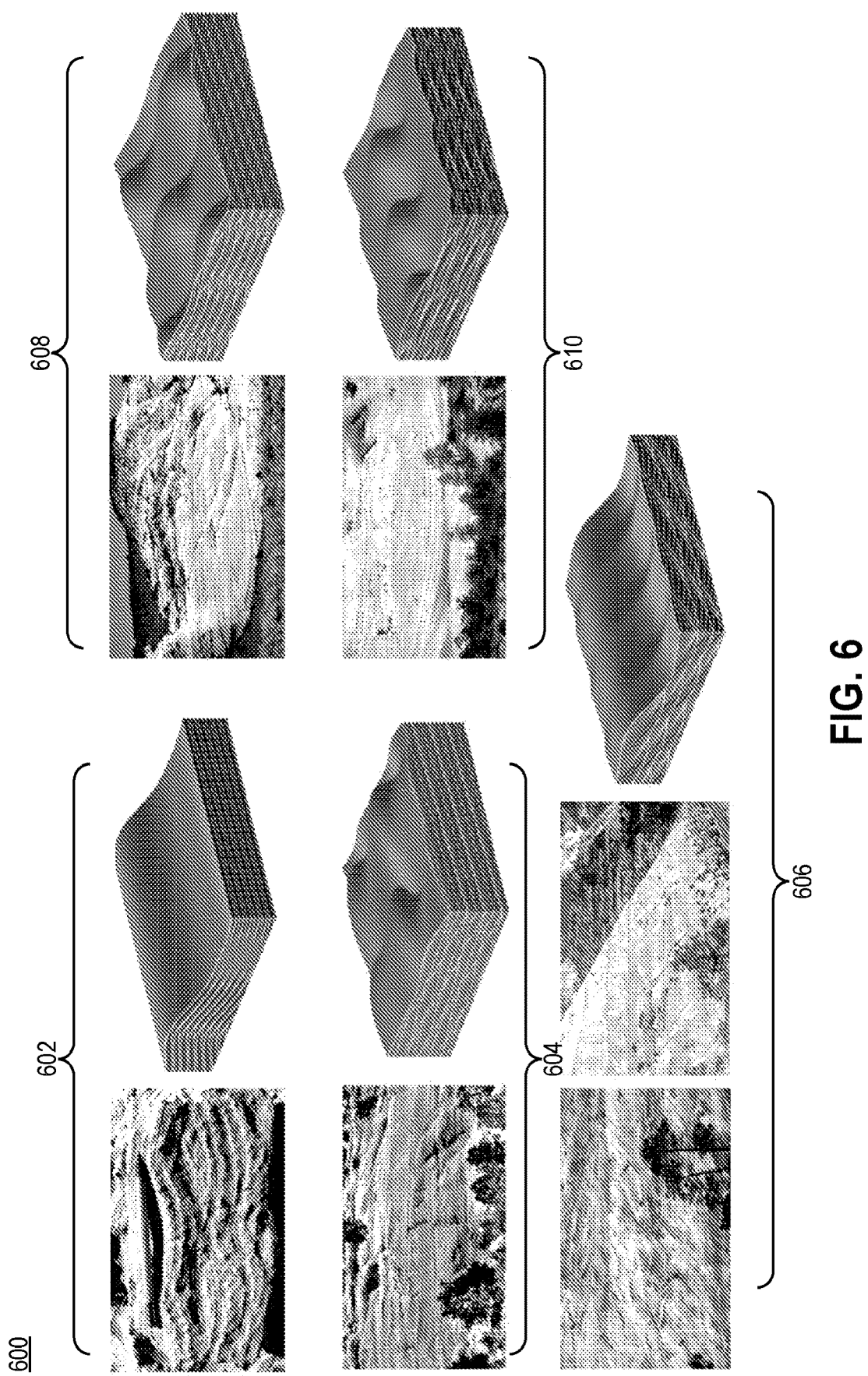
FIG. 6 is a diagram depicting examples of various computer models with matching field examples.

In regards to detecting objects in images, traditional computer vision methods may entail multiple-steps where input data is sent through a feature extraction step and then a spatial sampling may be applied, which in turn is passed through a classifier and detection output is obtained. Even within this traditional computer vision methodology, a machine learning classifier, such as support vector machine or decision tree methods, may be used. In addition to traditional computer vision techniques, end-to-end machine learning algorithms and deep learning methods may be used. As deep learning (DL) methods became easier to implement, DL algorithms demonstrated that they could create end-to-end workflows where 2D input image data is fed in and output detection comes out all at once. Further, intermediate steps such as feature extraction, spatial sampling and classification are achieved within deep artificial neural network architectures and convolutional neural networks (CNN) are leading architectures in object detection in images. When CNN has been combined with a gradient-based learning method called backpropagation, it has led to a new way for efficient image classification as demonstrated with LeNet architecture (CNN-based). For example, classifying handwritten digits with CNNs is illustrated in FIG. 6 along with examples of the above mentioned compute models with matching field examples. CNNs may be preferred, as they tend to be easier to train than fully-connected neural networks, and various improvements to CNNs proposed as well as larger, deeper architectures for applications in various fields.

Regarding FIG. 6, sets of images are provided that include one or more images of a specific rock formation with an associated computer model rendering of the specific rock formation. Arizona sample 602 shows a structure formed by reversing ripples with modern fluvial deposits from the Colorado River, Grand Canyon National Park, Arizona. Utah sample 604 shows structures including a relatively complicated cross-bedding formed by irregular, 3D dunes from eolian deposits in the Temple Cap Sandstone (Jurassic), Zion National Park, Utah. Further, Utah sample 606 shows structures formed with along-crest-migration superimposed dunes from Navajo Sandstone (Upper Triassic and Jurassic), Zion National Park, Utah. Utah sample 608 shows a structure produced by sinuous, out-of-phase bedform from eolian deposits in the Navajo Sandstone (Upper Triassic and Jurassic) near Snow Canyon, Utah. Additionally, Utah sample 610 includes a structure formed by a dune with a sinuous lee slope but without scour pots in the trough from Navajo Sandstone (Upper Triassic and Jurassic), Zio National Park, Utah.

Per an image classification task, various milestone architectures and methods exist. For example, various improvements over LeNet architecture have been introduced, such as using a rectified linear unit (ReLU) for the nonlinearity function instead of sigmoid functions, implementing dropout layers for regularization, using augmentation techniques like translation and reflection, as well as utilizing stochastic gradient descent to train the architecture. Deeper architectures such as VGGnet, GoogLeNet or ResNet achieved even better performance in classification.

In terms of object detection and localization, CNNs play a crucial role in advancing the field. CNN based architectures, R-CNN, Fast R-CNN, and Faster R-CNN consist of a region proposal algorithm and CNNs working on the proposed regions for object detection. However, the main drawback is the speed of execution, which has been improved with newer versions of the algorithm. Further, another important work for real-time object detection is a YOLO algorithm, which is a fully convolutional neural networks-based method and provides very fast detection at the expense of small accuracy reduction.

Regarding applying CNNs to borehole images, known methods include classifying three lithology groups on a limited dataset and application to greyscale micro-CT images of three different sandstones species to predict porous media properties. While CNNs are the preferred choice for seismic image processing, there are not many known applications of CNNs for use with borehole images. This may be because labeled datasets on borehole images are extremely expensive to obtain.

In some embodiments according to the present disclosure, a method of automated interpretation process 10 is provided. Automated interpretation process 10 may describe a method, using machine learning algorithms, to automatically interpret bedform geometries and depositional environments from cross-bed data and sedimentary features on borehole images. Automated interpretation process 10 may initially require construction of one or more forward models to generate one or more labeled images for each sedimentary geometry. Once a training set is built, one or more DL algorithms may be used to automatically classify one or more sedimentary structures (i.e., bedform geometries) and provide priors for depositional environments.

Figure 7:
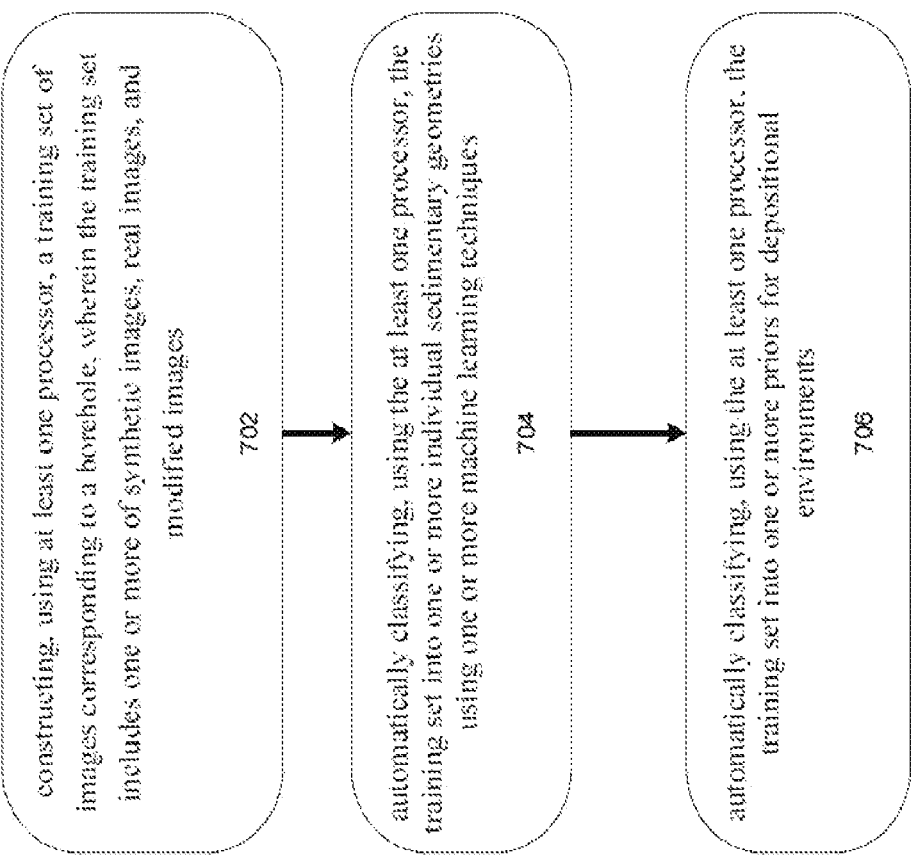
FIG. 7 is a diagram depicting an embodiment of a method of automated interpretation process in accordance with the present disclosure.
Figure 8:
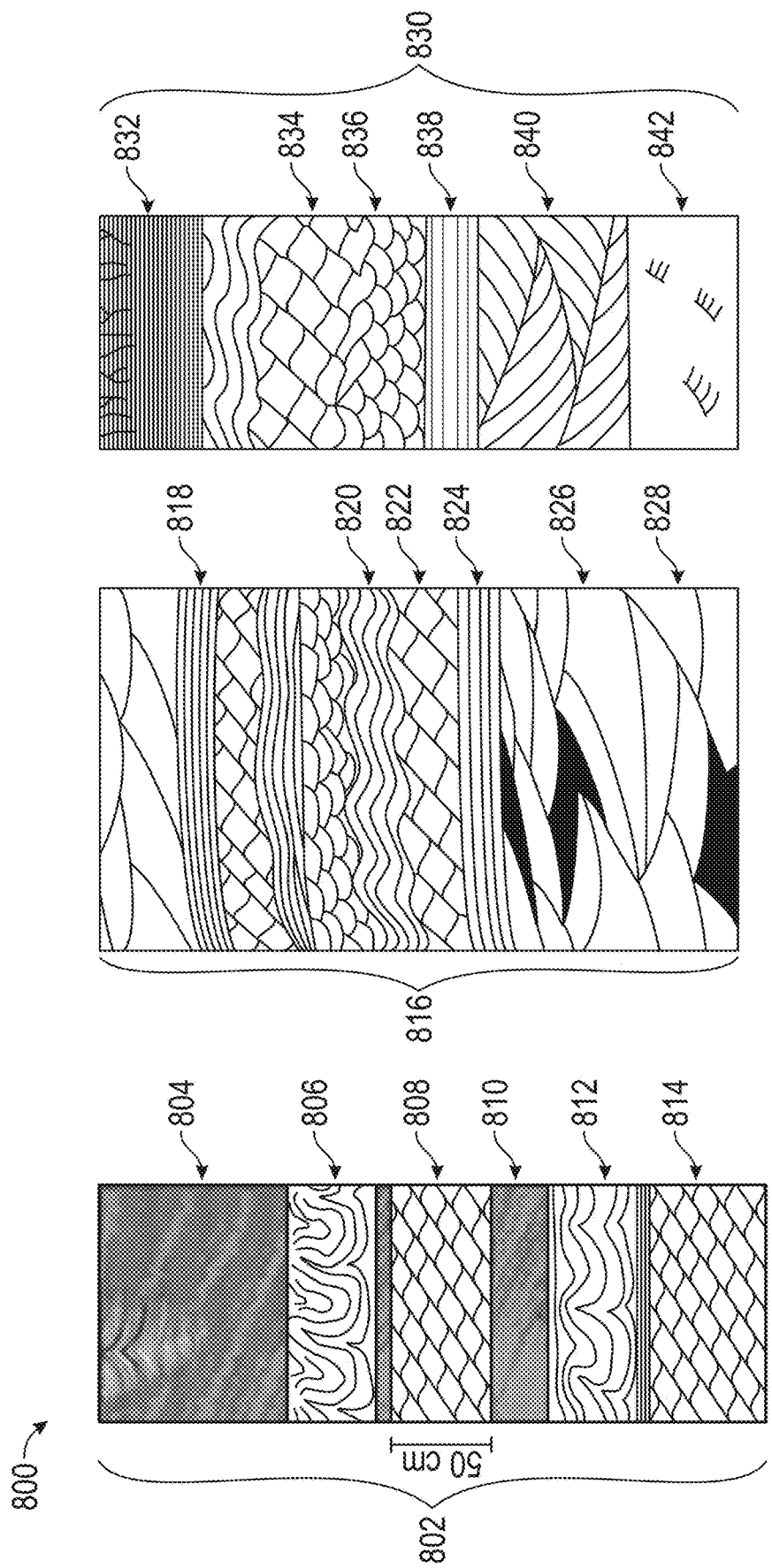
FIG. 8 is a diagram depicting examples of sequences of sedimentary geometries defining depositional environments.

Specifically, automated interpretation process 10 may include constructing 702, using at least one processor, a training set of synthetic images corresponding to a borehole, wherein the training set includes one or more of synthetic images, real images, and modified images, as illustrated in FIG. 7. The training set may include one or more of synthetic images, real images, and modified images similar to real borehole images. Further, this may include using a forward model used to generate the synthetic images, and the addition of 'noise' to the synthetic images to better mimic real images. Automated interpretation process 10 may further include automatically classifying 704, using the at least one processor, the training set into one or more individual sedimentary geometries using one or machine learning techniques. Automatically classifying one or more individual sedimentary geometries may include using one or more DL algorithm. Specifically, one or more of development of specific machine learning techniques to classify the individual sedimentary structures may be included. Further, automated interpretation process 10 may include automatically classifying 706 into priors for depositional environments. This may include developing specific machine learning techniques to provide a prior for depositional environments. Additionally, automatically classifying into priors for depositional environments may include building or more tables of sedimentary geometry successions that represent each depositional environment. The tables may illustrate one or more different sequences of sedimentary geometries defining specific depositional environments. Further, the creation of the tables may require extensive literature review by domain experts in order to generate a review data set. The one or more tables may then be used to automatically obtain depositional environments from borehole images. FIG. 8 illustrates sequences of sedimentary geometries defining depositional environments. For example, floodplain 802 illustrates six layers of sedimentary geometries, including: (1) mud layer 804, which may be finely laminated; (2) convolute bedding layer 806, which may be comprised of finely laminated mud; (3) climbing ripple lamination layer 808; (4) finely laminated mud layer 810; (5) convolute bedding layer 812, which may include a sandy layer; and (6) climbing ripple lamination layer 814. Further, point bar 816 may include: (1) mud layer 818; (2) small ripple layer 820, which may include cross-bedding; (3) climbing ripple lamination layer 822; (4) horizontal lamination layer 824; (5) lapse-scale cross-bedding layer 826; and (6) channel last deposit layer 828. Additionally, levee 830 may include: (1) parallel bedded salty clay layer 832, which may include burrows; (2) climbing ripple lamination layer 834; (3) small ripple cross-bedding layer 836; (4) horizontal bedding layer 838; (5) large-scale cross-bedding layer 840; and (6) salt and sand layer 842, where the salt and sand may be poorly sorted with no internal structure and occasional ripples.

One or more borehole images may be required to be combined with one or more other types of measurements to more accurately define a depositional environment in an effort to provide priors for depositional environments. Further, one or more automated individual sedimentary geometry predictions may be utilized to establish a depositional environment predictor. The depositional environment predictor may include the following forms. First, the depositional environment predictor may utilize a decision tree-based machine-learning algorithm that is trained on extensive literature review data set generated by the domain experts. Once trained, decision-tree based algorithms may be very fast in inference and easy to interpret. Second, one or more fuzzy-logic based algorithms may be utilized that can utilize one or more uncertainty measures created during the automated individual sedimentary prediction to construct one or more fuzzy-logic decision rules for depositional environments. Third, a probabilistic graphical model may be built on the domain expert's knowledge data set and utilized with one or more uncertainty estimations of the automated individual sedimentary prediction.

In some embodiments according to the present disclosure, automated interpretation process 10 may include allowing one or more borehole image interpretations to be integrated into 3D subsurface modeling. Specifically, a depositional environment from dips interpreted on borehole images may be automatically estimated.

In some embodiments according to the present disclosure, automated interpretation process 10 may include automatically providing both classification of sedimentary geometries regardless of borehole deviation as well as priors for depositional environment interpretations, and their associated uncertainties using one or more machine learning techniques.

Regarding potential applications of automated interpretation process 10, automated interpretation process 10 may be applied to interpretation of one or more borehole images, which may help a borehole geologist to interpret borehole images faster, to decrease user bias, and/or to add a level of interpretation to known borehole images analysis. Automated interpretation process 10 may also be applied to 3D facies modeling where the outputs from automated interpretation process 10 may be used directly as input to build one or more 3D facies models. Specifically, it is a crucial step to include borehole image interpretation in 3D subsurface models. Further, automated interpretation process 10 may be used with exploration as the use of the depositional environment logs, combined with stratigraphic sequences from seismic will enhance exploration studies by facilitating identification of new drilling targets.

Figure 9:
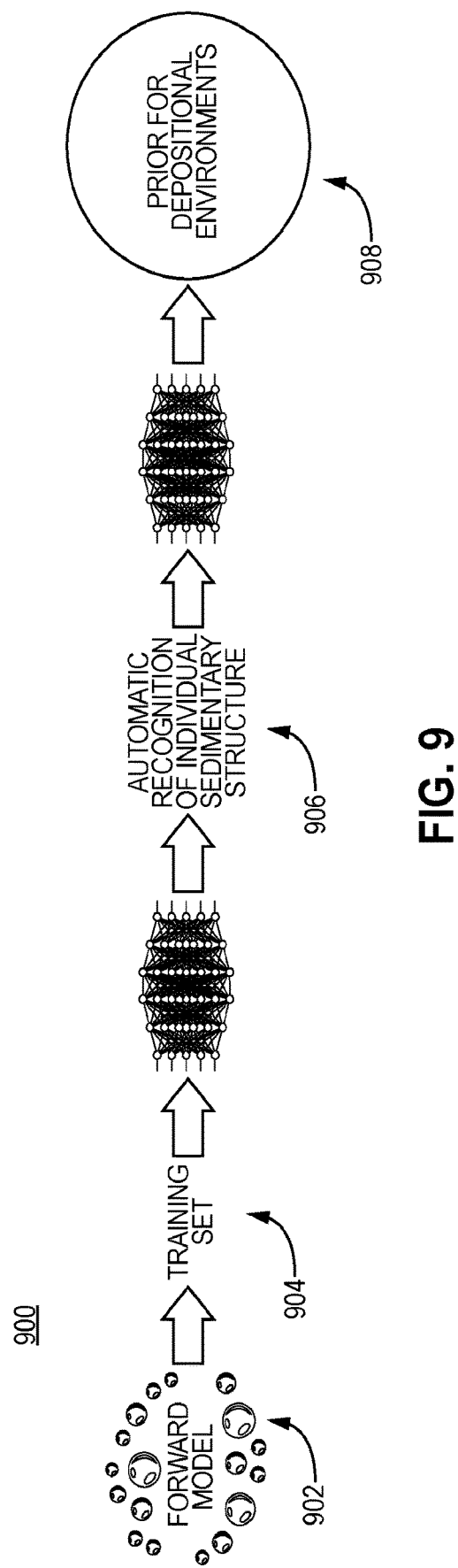
FIG. 9 is a block diagram depicting an embodiment of a method of automated interpretation process in accordance with the present disclosure.

Regarding FIG. 9, a method and system in accordance with the present disclosure is shown. Forward model 902 may be used with training set 904 where individual sedimentary structures 906 may then be recognized. Further, priors for depositional environments 908 may be acquired.

Figure 10:
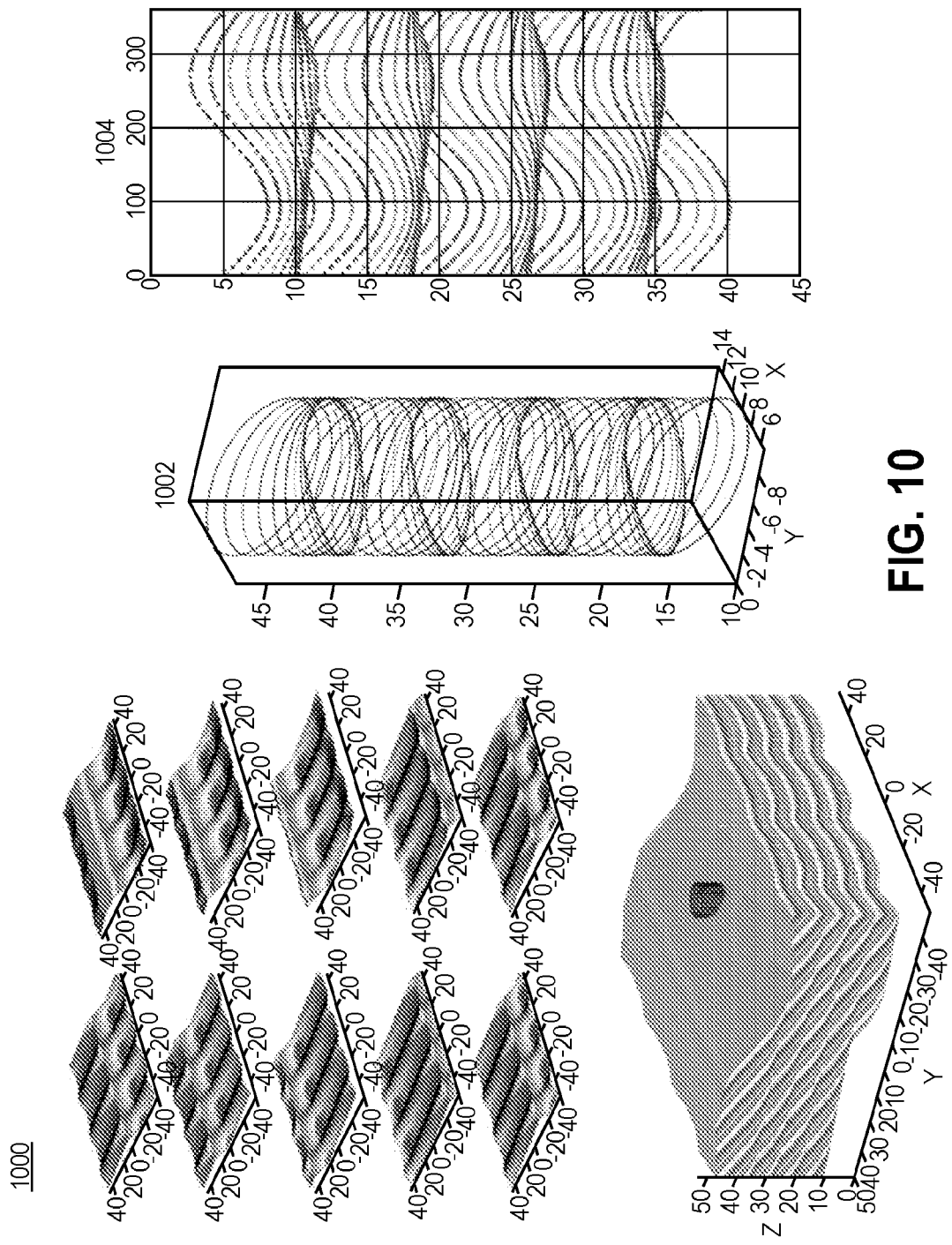
FIG. 10 is a diagram depicting an embodiment of an automated interpretation process in accordance with the present disclosure.
Figure 11:
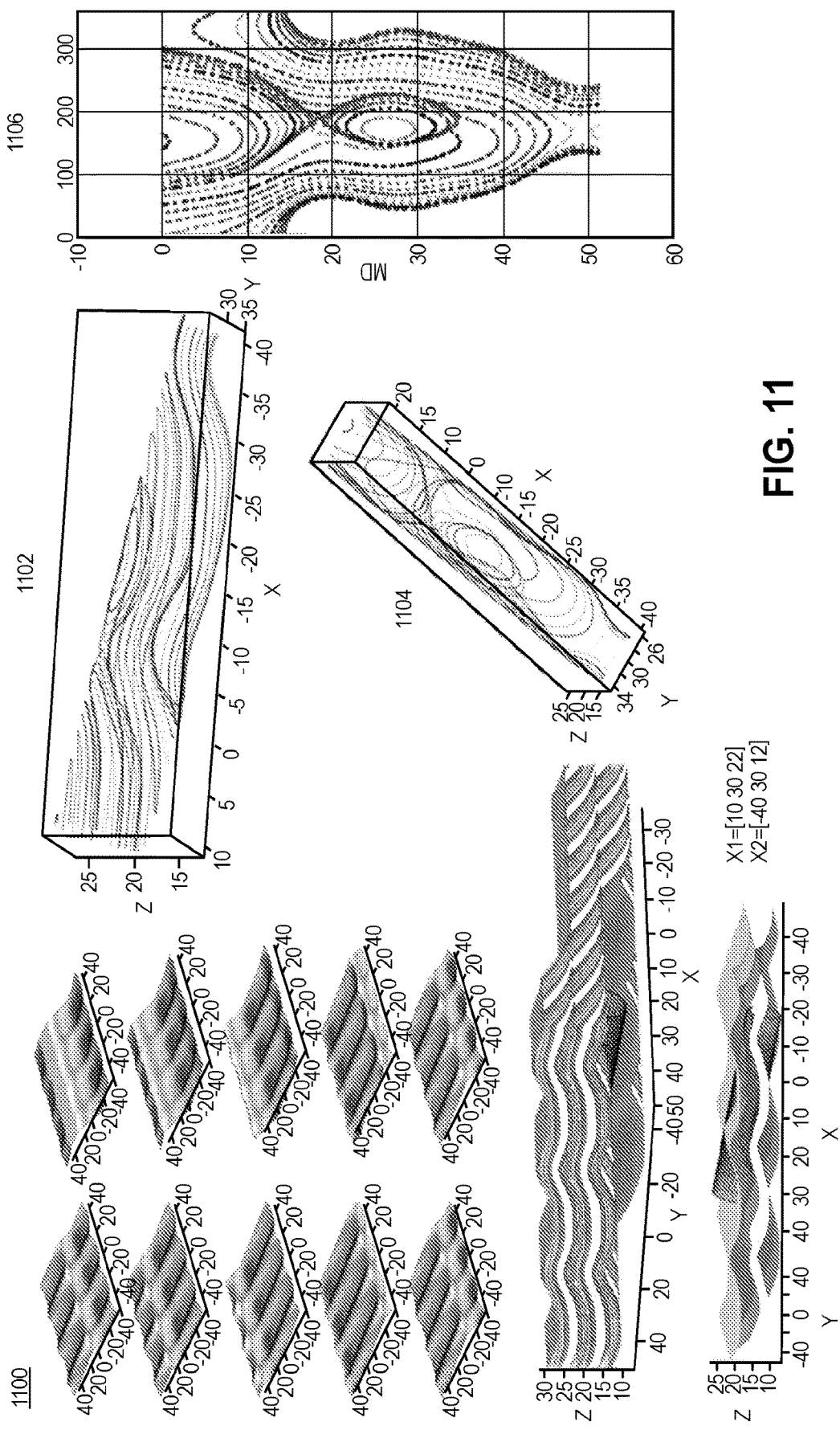
FIG. 11 is a diagram depicting an embodiment of an automated interpretation process in accordance with the present disclosure.

Referring back to FIG. 5, a modification of existing computer models is provided. In this example, 59 computer models may be used as a starting point. These models may be selected due to the variety of the sedimentary geometries represented, and their link to real field examples, as illustrated in FIG. 6. One or more computer models may be used where the computer models include Matlab code, of which the results are illustrated in FIG. 10 and FIG. 11. FIG. 10 illustrates an example of automated interpretation process 10 with intermediate surfaces, computational of an intersection between surfaces and a vertical cylinder and creation of one or more resulting synthetic images with subsurface intersections denoted as 1002 and an azimuth in degrees denoted as 1004. FIG. 11 illustrates an example of automated interpretation process 10 with *intermedia* surfaces, computation of an intersection between surfaces and a highly deviated cylinder, and creation of one or more resulting synthetic images where subsurface interactions are denoted as 1102 and 1104 and an azimuth in degrees is denoted as 1106. In general, the one or more computer models may include one or more of the following extract all intermediate surfaces, for each computer model, respecting rules of deposition, create a cylinder, representing a well drilled through the structures, compute intersections between the surfaces and the cylinder, and create a synthetic, oriented image representing the intersections between the surfaces and the cylinder/well. In this example, a sinusoid may represent and intersection between a planar surface and a well. The one or more synthetic images may represent results a borehole geologist would obtain after picking features on a real processed borehole image.

Figure 12:
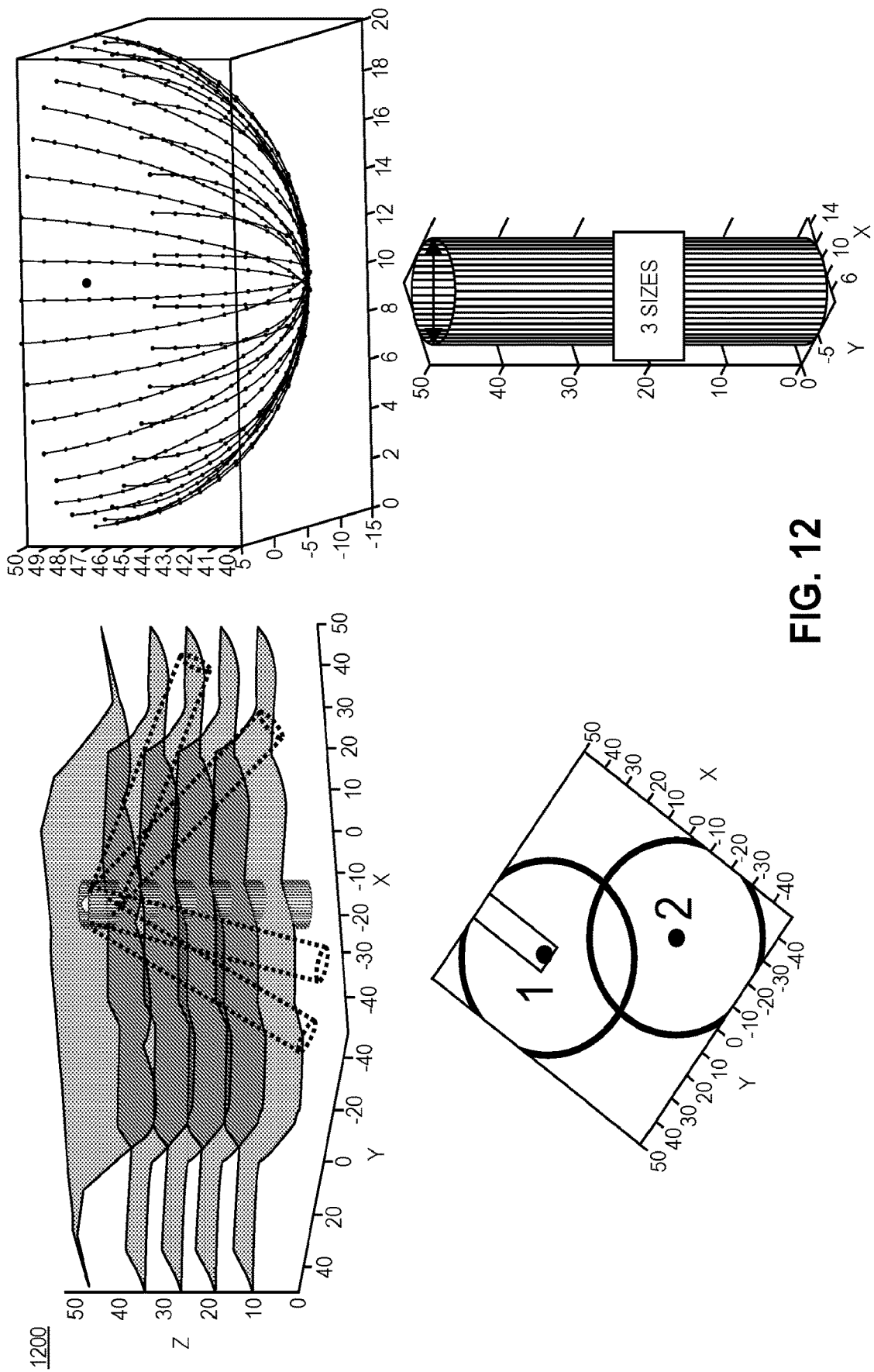
FIG. 12 is a diagram depicting an embodiment of an automated interpretation process in accordance with the present disclosure.

Referring to FIG. 12, an embodiment in accordance with the present disclosure is illustrated showing creation of one or more synthetic images with various well parameters. Specifically, automated interpretation process 10 may be trained using one or more images generated from wells with multiple deviations in an attempt to automatically recognize one or more sedimentary geometries from one or more borehole images, regardless of the borehole deviation. Further, FIG. 12 illustrates use of one or more different well parameters used to generate one or more synthetic images including one or more of well orientation, well deviation, well location, and well azimuth. For example, FIG. 12 includes the following parameters: (1) two different well locations in the 3D model; (2) three different well diameters (i.e., representing diameters of 4", 8.5" and 12.25"; (3) multiple well deviations (i.e., every 10°, from 0° to 90°); and (4) multiple well orientations (i.e., every 10°, from 0° to 360°).

Figure 13:
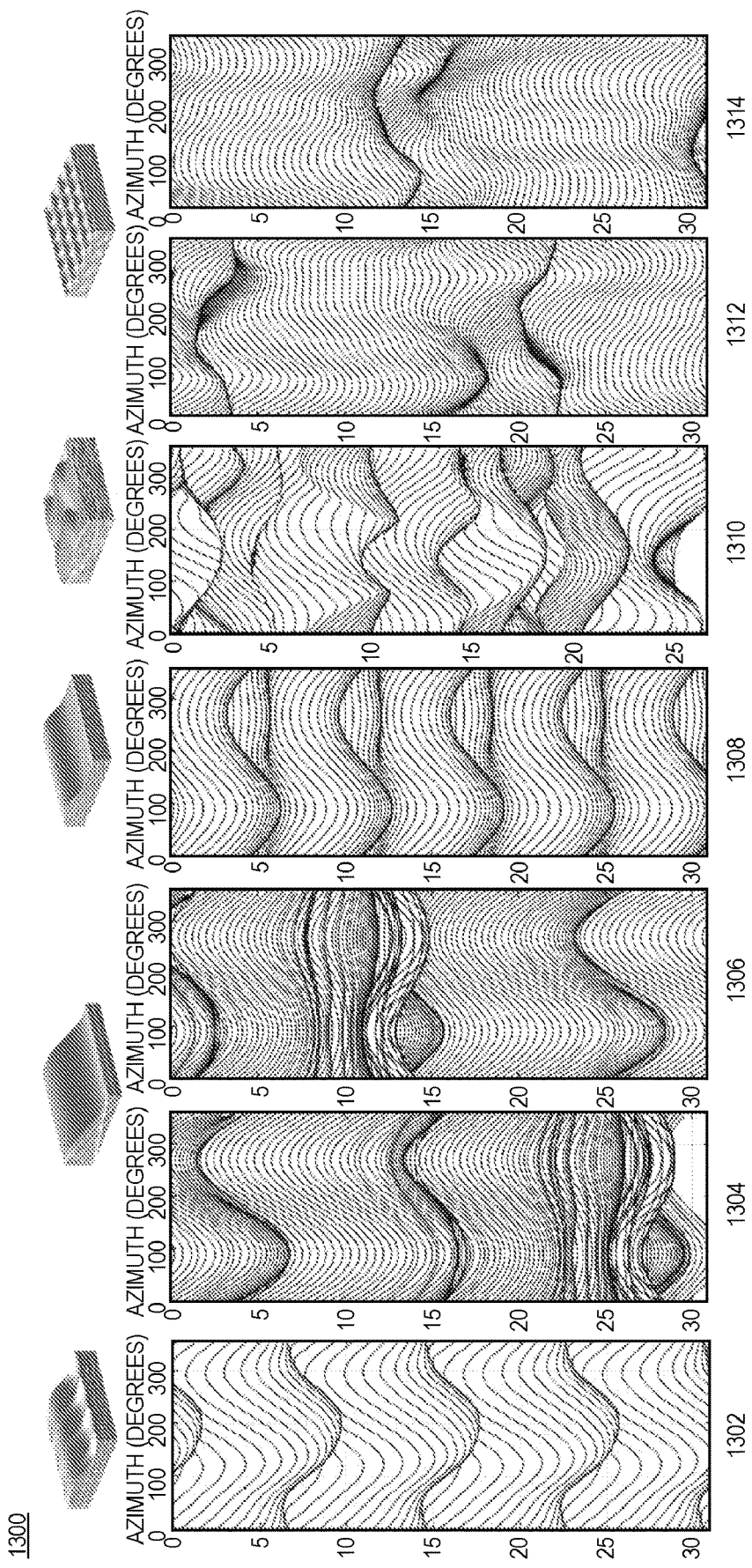
FIG. 13 is a diagram depicting an embodiment of an automated interpretation process in accordance with the present disclosure.
Figure 14:
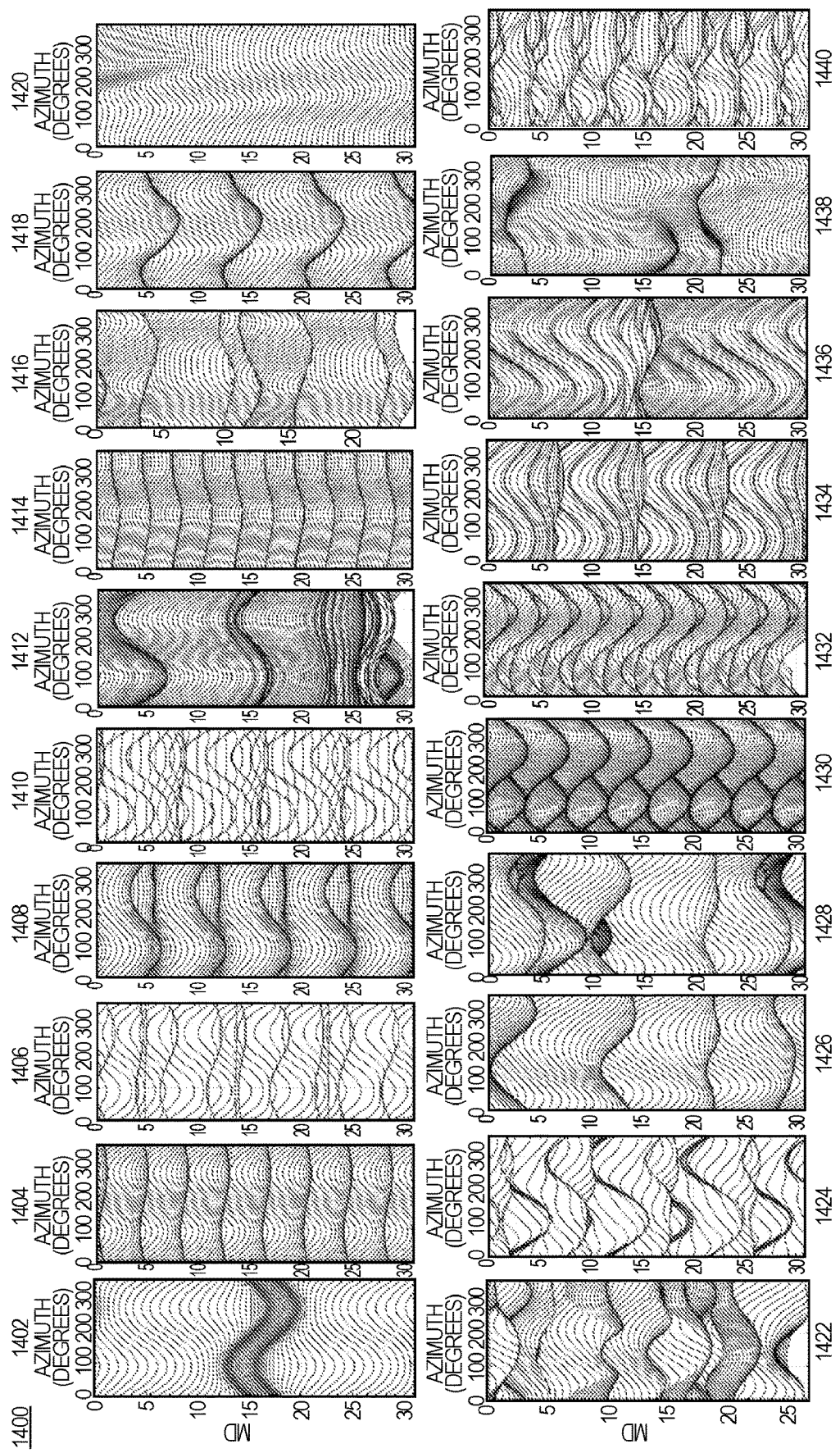
FIG. 14 is a diagram depicting an embodiment of an automated interpretation process in accordance with the present disclosure.

Referring to FIG. 13 and FIG. 14, examples of synthetic images are presented. FIG. 13 illustrates examples of synthetic images (i.e. 1302, 1304, 1306, 1308, 1310, 1312 and 1314), generated from vertical wells and their associated 3D models. FIG. 14 illustrates examples of synthetic images created from vertical wells in different 3D models (i.e., 1402, 1404, 1406, 1408, 1410, 1412, 1414, 1416, 1418, 1420, 1422, 1424, 1426, 1428, 1430, 1432, 1434, 1436, 1438 and 1440).

Figure 15:
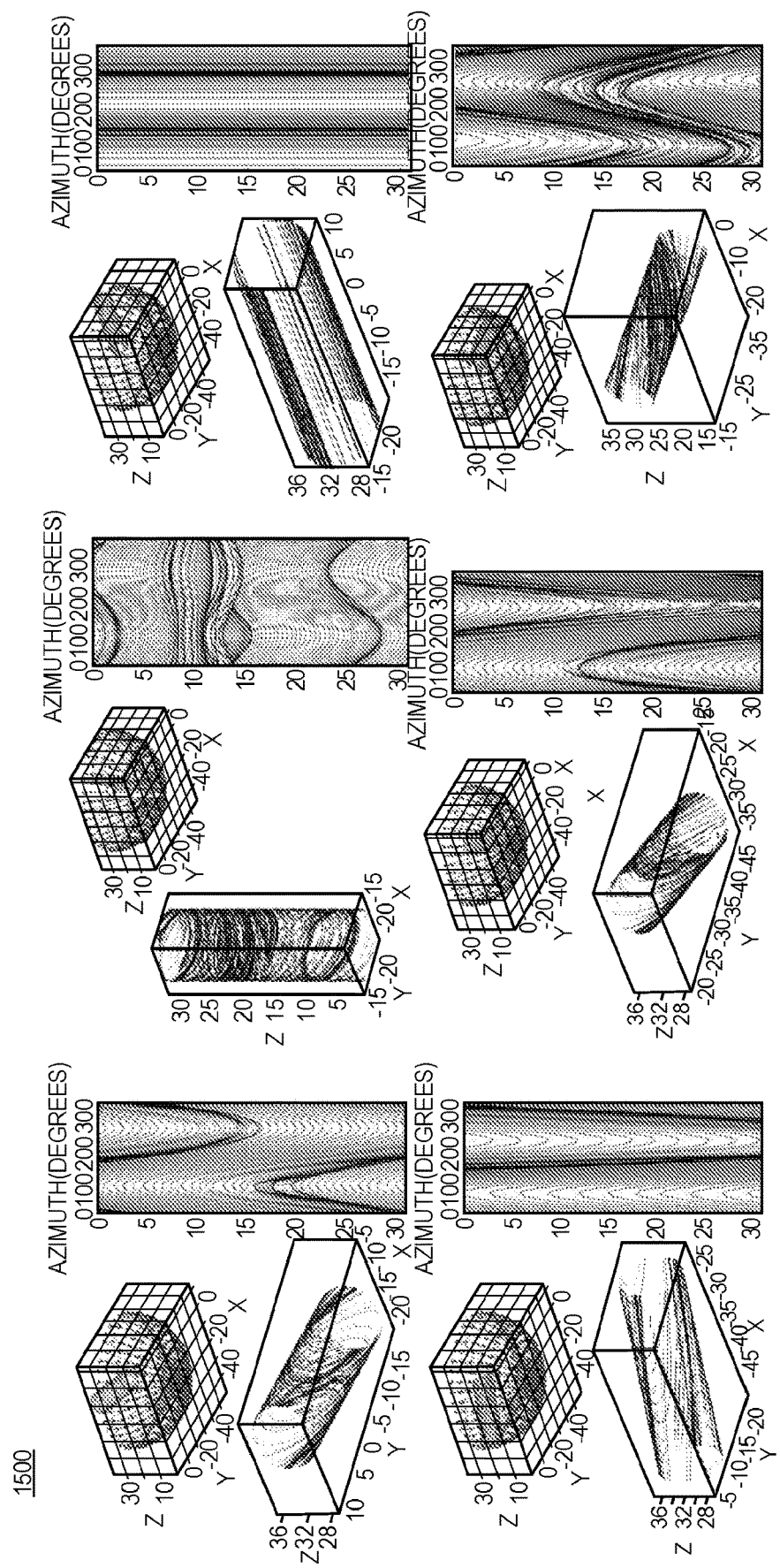
FIG. 15 a diagram depicting an embodiment of an automated interpretation process in accordance with the present disclosure.

Referring to FIG. 15, FIG. 15 illustrates examples of synthetic images generated from 1412, with a vertical well and highly deviated wells with different orientations. The cylinder in the demi-sphere illustrates the orientation of the well in the model. Further, the intersections between the surfaces and the cylinder/well are also represented.

Figure 16:
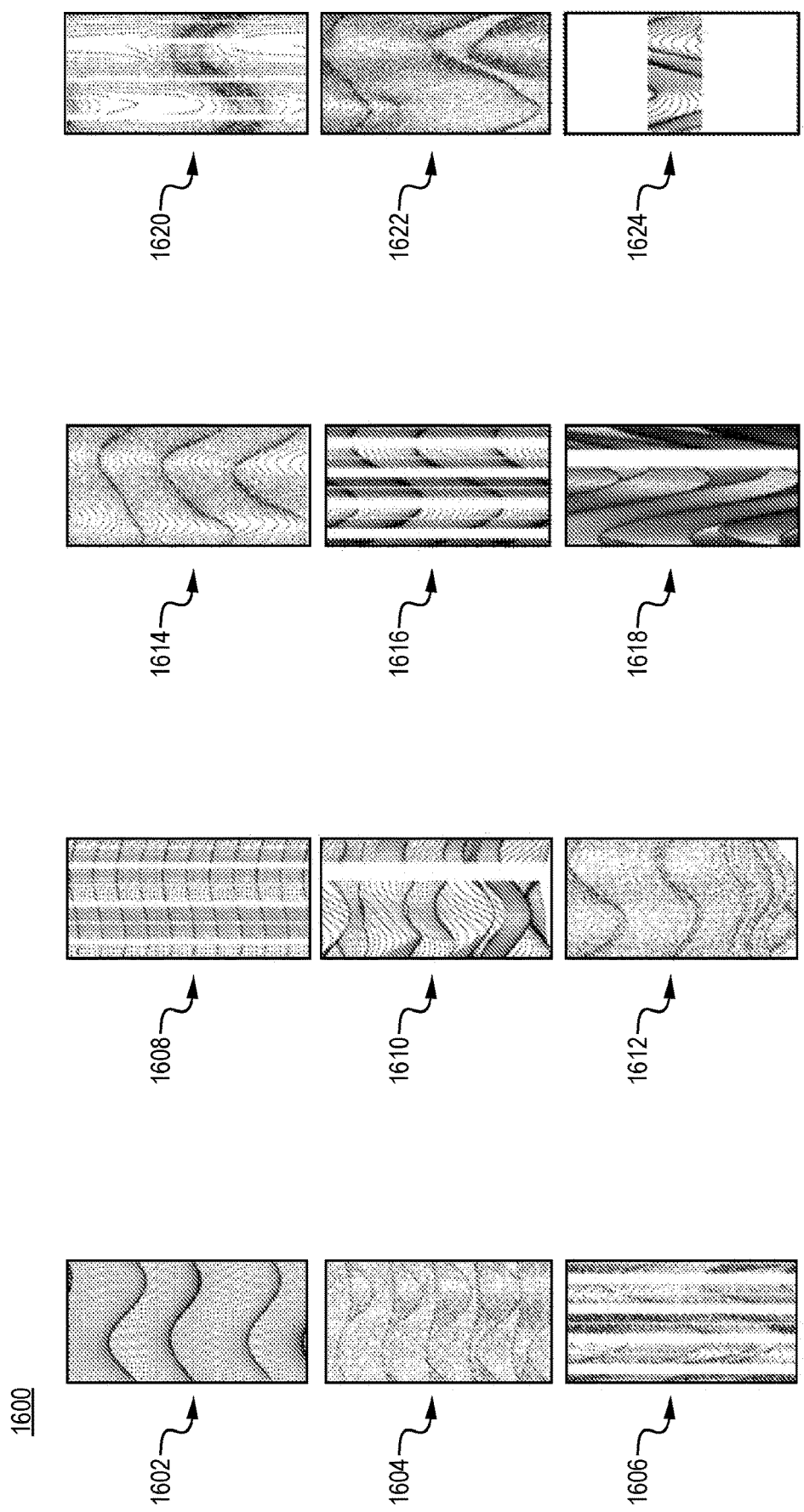
FIG. 16 is a diagram depicting an embodiment of an automated interpretation process in accordance with the present disclosure.

Additionally, FIG. 16 illustrates the addition of one or more noisy images to the training set and, specifically, adding noise to the synthetic images to be closer from real images, including stripes, 'salt', and truncations. For example, sample 1602 illustrates no noise. Sample 1606 illustrates an 8.5" hole with 50% 'white' noise added. Sample 1606 illustrates a 12.25" hole with 60% coverage with stripes like formation micro-imager (FMI) FMI images along with 40% white noise added. Sample 1608 illustrates an 8.5" hole with 80% coverage and stripes like FMI images. Sample 1610 illustrates an 8.5" hole with one white stripe (i.e., one flap/pad not working). Sample 1612 illustrates a 12.25" hole with 50% 'white' noise added. Further, sample 1614 illustrates an 8.5" hole with 40% 'white' noise added. Sample 1616 illustrates a 12.25" hole with 60% coverage and stripes like FMI images. Additionally, sample 1618 illustrates a 12.25" hole with one white stripe (i.e., one flap/pad not working). Sample 1620 illustrates an 8.5" hole with 80% coverage, stripes like FMI images, and 40% 'white' noise added. Sample 1622 illustrates a 12.25" hole with a 40% 'white' noise added. Further, sample 1624 illustrates a truncated image.

To train automated interpretation process 10 with one or more borehole images that are as realistic as possible, noise may be added to the one or more synthetic images. Different levels of noise considered may include one or more of: (1) adding one or more masking stripes on the one or more synthetic images, thus reproducing limited coverage of certain types of pad-based imaging tools with, for example, 60% coverage in 12.25" hole diameter, or 80% coverage in 8.5" hole diameter; (2) adding one stripe on the one or more synthetic images, which may be equivalent to one pad or one flap not functioning; (3) adding a one-pixel stripe to one or more of the one or more synthetic images, which may be equivalent to a dead button; (4) adding 'white' noise to the one or more synthetic images to represent discontinuous interpretation obtained when the discontinuous (i.e., segment) extraction of sedimentary surfaces is used to automatically pick one or more features on the one or more synthetic images, or results when other patterns like breakouts and fractures are present also on the borehole images where different percentages of noise may be added to the one or more synthetic images (i.e., up to 50%); (5) translating patterns on the one or more synthetic images; (6) truncating the one or more synthetic images where only a limited part of the one or more synthetic images may be observed on a real image and one or more sections may be randomly selected on the images to train automated interpretation process 10 with truncated images; and (7) adding geometric noise where the borehole may not be perfectly circular (i.e., ellipse), and small depth error between pad may exist.

Figure 17:
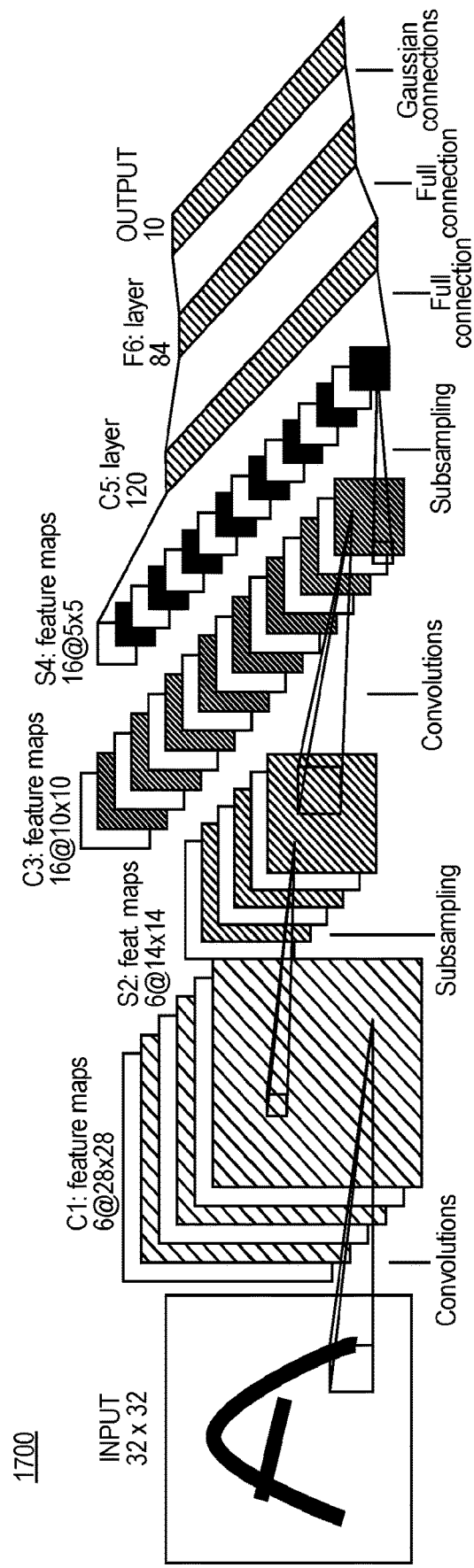
FIG. 17 is a diagram depicting the LeNet-5 architecture.

In some embodiments according to the present disclosure, multiple noise levels may be combined. An initial comparison demonstrates that well known machine learning methods such as support vector machines, decision trees, random forest method, and fully-connected neural networks, do not perform as well as CNN based methods in classification of synthetically generated 2D image data. On one hand, data may be converted into a very long input vector, thus spatial features may not be able to be captured. However, a CNN may extract one or more spatial features from 2D input images directly, as illustrated in FIG. 17 which illustrates a LeNet-5 architecture.

Further, using a ResNet architecture, also referred to herein as "ResNet classification module" may be the most beneficial in classification in automated interpretation process 10. For example, automated interpretation process 10 may include using one or more ResNet classification modules with different settings and combined into an ensemble method where results of multiple models are voted on, and the most voted class may be selected as the prediction providing a confidence score among all votes. Automated interpretation process 10 may train the one or more ResNet classification modules on an 2D input image that is 40 to 200 pixels tall and 140 pixels wide. Such a small window of input may enable one or more small features to be captured and becomes crucial in the application of a sliding window. A sliding window may be applied as a spatial sampling method where a long borehole image is provided. Further, a sliding window may include defining a step of 5 to 10 pixel. At each step, a 50-pixel window of a long borehole image may be cropped around the step point. This cropped image may be fed into the one or more ResNet classification models and a classification prediction may be obtained. Stepping through an entire borehole image, one or more classes of which the borehole image belongs to may be determined.

Additionally, a more advanced method of identification and localization may be performed using the YOLO (You-Only-Look-Once) algorithm. In this approach, an entire borehole image may be fed into the automated interpretation process 10 and the YOLO algorithm may provide one or more coordinates of individual sedimentary geometries by placing boxes around each in addition to the class labels. Since the YOLO algorithm is a fully-convolutional approach (i.e., it does not utilize sliding windows explicitly), it is may be significantly faster than above described method using one or more ResNet classification models.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Having thus described the disclosure of the present application in detail and by reference to embodiments thereof, it will be apparent that modifications and variations are possible without departing from the scope of the disclosure defined in the appended claims.

What is claimed is:

1. A method for automated stratigraphy interpretation from borehole images comprising:
constructing, using at least one processor, a training set of images corresponding to a borehole, wherein the training set includes one or more of synthetic images, real images, and modified images;
automatically classifying, using the at least one processor, the training set into one or more individual sedimentary geometries using a machine learning model that has been trained based on images generated from wells with multiple deviations to automatically recognize one or more sedimentary geometries from one or more borehole images, regardless of borehole deviation, wherein the automatically classifying comprises:
identifying a longer than standard borehole image in the training set of images; and
applying a sliding window as a spatial sampling technique based on the identifying the longer than standard borehole image, wherein the spatial sampling technique includes providing a plurality of cropped images, corresponding to the sliding window, from the longer than standard borehole image as inputs to the machine learning model; and automatically classifying, using the at least one processor, the training set into one or more priors for depositional environments, wherein the automatically classifying into the one or more priors includes:

building one or more tables of sedimentary geometry successions that represent one or more depositional environments; and automatically obtaining, using the one or more tables, depositional environments from the training set of images.

2. The method of claim 1, wherein the automatically classifying into the one or more priors for the depositional environments includes applying one or more machine learning techniques.

3. The method of claim 1, wherein an addition of noise includes at least one of adding one or more masking stripes on one or more synthetic images of the synthetic images, adding one stripe on the one or more synthetic images, adding a one-pixel stripe to the one or more synthetic images, adding white noise to the one or more synthetic images, translating patterns on the one or more synthetic images, truncating the one or more synthetic images, or adding geometric noise.

4. The method of claim 1, further comprising:

utilizing one or more automated individual sedimentary geometry predictions to establish a depositional environment predictor.

5. The method of claim 4, wherein the depositional environment predictor includes a decision tree-based machine-learning, fuzzy-logic based algorithms, or a probabilistic graphical model.

6. A system for automated stratigraphy interpretation from borehole images comprising:

a memory configured to store one or more borehole images;

at least one processor configured to:

construct a training set of images corresponding to a borehole, wherein the training set includes one or more of synthetic images, real images, and modified images;

automatically classify the training set into one or more individual sedimentary geometries using a machine learning model that has been trained based on images generated from wells with multiple deviations to automatically recognize one or more sedimentary geometries from one or more borehole images, regardless of borehole deviation, wherein the automatically classifying comprises:

identifying a longer than standard borehole image in the training set of images; and applying a sliding window as a spatial sampling technique based on the identifying the longer than standard borehole image, wherein the spatial sampling technique includes providing a plurality of cropped images, corresponding to the sliding window, from the longer than standard borehole image as inputs to the machine learning model;

automatically classify the training set into one or more priors for depositional environments, wherein the automatically classifying into the one or more priors includes:

building one or more tables of sedimentary geometry successions that represent one or more depositional environments; and automatically obtaining, using the one or more tables, depositional environments from the training set of images.

7. The system of claim 6, wherein constructing the training set includes a forward model to generate the synthetic images.

8. The method according to claim 1, wherein constructing the training set includes a forward model to generate the synthetic images.

9. The method according to claim 8 wherein constructing the training set further includes an addition of noise to the synthetic images.

10. The system of claim 7, wherein constructing the training set further includes an addition of noise to the synthetic images.

11. The system of claim 6, wherein the automatically classifying into the one or more priors for the depositional environments includes applying one or more machine learning techniques.

12. The system of claim 6, wherein an addition of noise includes at least one of adding one or more masking stripes on one or more synthetic images of the synthetic images, adding one stripe on the one or more synthetic images, adding a one-pixel stripe to the one or more synthetic images, adding white noise to the one or more synthetic images, translating patterns on the one or more synthetic images, truncating the one or more synthetic images, or adding geometric noise.

13. The system of claim 6, further comprising:

utilizing one or more automated individual sedimentary geometry predictions to establish a depositional environment predictor.

14. The system of claim 13, wherein the depositional environment predictor includes a decision tree-based machine-learning, fuzzy-logic based algorithms, or a probabilistic graphical model.

* * * * *